United States Patent [19]

Okabe et al.

[11] Patent Number: 4,725,472
[45] Date of Patent: Feb. 16, 1988

[54] BIAXIALLY ORIENTED POLYESTER FILM

[75] Inventors: Kazuo Okabe, Shiga; Masahiko Motegi, Hikone; Yasuki Miura, Ohtsu, all of Japan

[73] Assignee: Toray Industries, Inc., Otsu, Japan

[21] Appl. No.: 6,257

[22] Filed: Jan. 14, 1987

Related U.S. Application Data

[63] Continuation of Ser. No. 861,117, May 7, 1986, abandoned, which is a continuation of Ser. No. 377,680, May 12, 1982, abandoned.

[30] Foreign Application Priority Data

May 20, 1981 [JP] Japan .................................. 56-74802

[51] Int. Cl.$^4$ .............................................. G11B 5/70
[52] U.S. Cl. .................................... 428/141; 428/143; 428/147; 428/156; 428/480; 428/694; 428/900; 428/910
[58] Field of Search ............... 428/141, 143, 147, 156, 428/480, 694, 900, 910

[56] References Cited

U.S. PATENT DOCUMENTS

| | | | |
|---|---|---|---|
| 3,821,156 | 6/1974 | Farrar | 260/40 |
| 3,958,064 | 5/1976 | Brekken et al. | 428/336 |
| 4,067,855 | 1/1978 | Miwa et al. | 260/75 |
| 4,138,386 | 2/1979 | Motegi et al. | 260/40 |
| 4,348,446 | 9/1982 | Mitsuishi | 428/148 |
| 4,461,797 | 7/1984 | Adachi et al. | 428/147 |

FOREIGN PATENT DOCUMENTS 1359892 7/1974 United Kingdom .
2087302 5/1982 United Kingdom .

Primary Examiner—John E. Kittle
Assistant Examiner—P. R. Schwartz
Attorney, Agent, or Firm—Austin R. Miller

[57] ABSTRACT

A biaxially oriented polyester film is provided, which has a plurality of depressions and a plurality of protrusions on at least one surface thereof, in a configuration such that at least one protrusion exists within each depression or at least protrusion exists in the area where two or more depressions are contiguous to each other depressions having an area fraction of from $1 \times 10^{-3}$ to $6 \times 10^{-1}$. The polyester film is useful as a substrate for magnetic recording tapes such as audio and video tapes, and the resultant magnetic recording tapes are excellent in both electromagnetic transducing characteristics and runnability.

20 Claims, 9 Drawing Figures

BIAXIALLY ORIENTED POLYESTER FILM

This application is a continuation of application Ser. No. 861,117, filed May 7, 1986, now abandoned, which is a continuation of application Ser. No. 377,680, filed May 12, 1982, now abandoned.

BACKGROUND OF THE INVENTION (1.) Field of the Invention

This invention relates to a biaxially oriented film mainly comprised of a polyester. More specifically, it relates to a biaxially oriented polyester film used as a substrate for magnetic recording media.

(2) Description of the Prior Art

A biaxially oriented polyester film is very useful as a substrate for magnetic recording media. Most magnetic recording media possess a laminate structure such that a magnetic recording layer is formed on a surface of a substrate film by means of coating, plating, or sputtering or other vapor deposition, and particularly, all of the currently widely accepted audio tapes and video tapes possess such a laminate structure. Regardless of the means whereby the magnetic recording layer is formed on the substrate film, it is common to all magnetic recording media that the substrate film plays an important role for the improvement in the characteristics of the magnetic recording media, particularly the electromagnetic transducing characteristics and running characteristics thereof.

Some proposals have heretofore been made for enhancing the abrasion resistance and runnability of a magnetic recording medium by incorporating in the substrate inert additives or both inert additives and internal particles defined as particles which have been formed by the reaction of an additive with the monomer or oligomer of the polyester (for example, refer to U.S. Pat. Nos. 3,821,156, 4,067,855 and 4,138,386 and British Patent No. 1,359,892). These proposed techniques provide substrate films having an increased number of surface protrusions possessing an enhanced height, which result in magnetic recording media of enhanced abrasion resistance and runnability. However, the substrate films are poor in surface smoothness and consequently in electromagnetic transducing characteristics.

It also has been proposed as described in U.S. Pat. No. 3,958,064 to prepare a two-layer coextruded film comprised of a relatively rough back layer containing polymeric particles and a relatively smooth face layer containing no particulate matter and to form a magnetic recording layer on the smooth face layer. It has been found, however, that the roughness of the back layer is transferred onto the smooth magnetic recording layer during the period when the magnetic recording tape is held in roll form, with the result that the desired degree of electromagnetic transducing characteristics cannot be attained.

Thus, no magnetic recording media have heretofore been put to practical use, which have satisfactory runnability and electromagnetic transducing characteristics both being at a high level of the extent desired in recent years.

By the term "runnability" as used herein is meant both frictional resistance and abrasion resistance. The term "protrusions" used herein means fine projections appearing on a surface of a film, which are dominated by the size and amount of particles incorporated in the film. The term "electromagnetic transducing characteristics" means characteristics expressing the level of a reproduced signal/recorded signal ratio and similar parameters and their variations, which characteristics include video signal-to-noise (S/N) ratio, chroma signal-to-noise (S/N) ratio, dropout and envelope, and their variations.

SUMMARY OF THE INVENTION

It is a primary object of the present invention to provide a biaxially oriented polyester film which results in high quality magnetic recording media, excellent in both electromagnetic transducing characteristics and runnability. It is another object of the present invention to provide such high quality magnetic recording media which may be video tapes.

In accordance with the present invention, there is provided a biaxially oriented polyester film which has a plurality of depressions and a plurality of protrusions on at least one surface thereof, in a configuration such that at least one protrusion exists within each depression or at least one protrusion exists in the area where two or more depressions are contiguous to each other; said depressions having an area fraction of from $1 \times 10^{-3}$ to $6 \times 10^{-1}$.

DESCRIPTION OF THE PREFERRED EMBODIMENTS

The polyester used for the preparation of the biaxially oriented film of the present invention is not particularly critical, provided that the biaxially oriented film can be used as a substrate of a magnetic recording medium. As the polyester, there can be mentioned straight chain aromatic polyester homopolymers which are obtained by the polycondensation of, for example, ethylene glycol with terephthalic acid and/or naphthalene dicarboxylic acid. The polyester may also include copolymers and mixed polymers, which contain at least 70% by weight of the units derived from straight chain aromatic polyester-forming ingredients.

The polyester constituting the biaxially oriented film of the present invention contains preferably 0.01 to 1.0% by weight, more preferably 0.02 to 0.5% by weight of inert inorganic particles and/or internal particles. As the inert inorganic particles, there can be mentioned particles of oxides, carbonates, phosphates, sulfates and complexes of Ti, Si, Ca, Mg, Na, Al, Zn and Ba. Such inert inorganic particles include, for example, calcium carbonate, silica, alumina, natural clay and kaolinite. Carbon is also included in the inert inorganic particles. These inert inorganic particles may be used either alone or in combination.

By the term "internal particles" as used herein is meant particles which are precipitated in the polyester by the fact that at least part of the catalyst residue or anti-coloring agent, containing Ca, Si, Mn, Mg, Sb, Ge, P, Li, K or Na, is reacted with a monomer or oligomer in the polycondensation stage thereby forming insoluble particles. Such internal particles are described in U.S. Pat. Nos. 4,138,386 and 4,067,855.

As the particulate matter contained in the polyester, internal particles derived from a catalyst residue containing Ca-Li-P or Ca-P, and inert inorganic particles predominantly comprised of $SiO_2$, $CaCO_3$ or kaolinite are preferable.

It is preferable that the internal particles have a volume average particle diameter of from 5 to $0.1\mu$, more preferably from 3 to $0.5\mu$, and the inert inorganic particles have a volume average particle diameter of from 5 to $0.01\mu$, more preferably from 2 to $0.03\mu$.

The biaxially oriented polyester film of the present invention is characterized as possessing a plurality of depressions and a plurality of protrusions on at least one surface thereof. These depressions and protrusions are present in a configuration such that one or more protrusions exist within each depression or one or more protrusions exist in the area where two or more depressions are contiguous to each other.

Figure 1A:
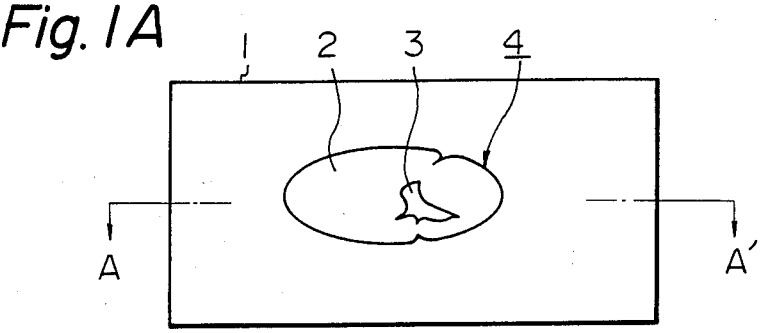
FIG. 1A is a diagrammatic plan view illustrating a depression having a protrusion therein and FIG. 1B is a diagrammatic cross-sectional view thereof cut along the line A-A' in FIG. 1A.
Figure 1B:
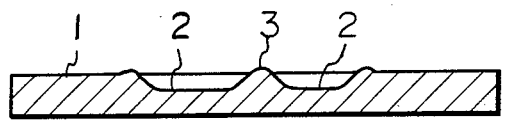
Figure 2A:
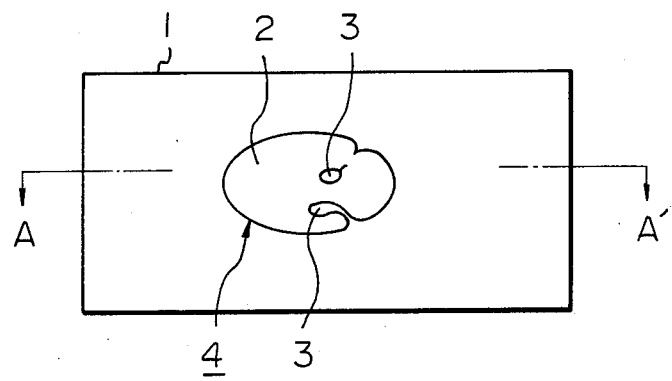
FIG. 2A is a diagrammatic plan view illustrating a depression having protrusions therein and FIG. 2B is a diagrammatic cross-sectional view thereof cut along the line A-A' in FIG. 2A.
Figure 2B:
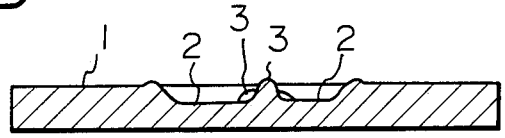

Referring to FIGS. 1A and 1B and FIGS. 2A and 2B, a plurality of depression-protrusion combinations 4 are formed on at least one surface of the biaxially oriented polyester film 1. Each combination is comprised of a depression 2 and one or more protrusions 3 present in the depression 2. The number of protrusion 3 present in each depression 2 may be either singular as shown in FIGS. 1A and 1B, or plural as shown in FIGS. 2A and 2B. The shape of the depression 2 is not particularly critical. The depression may be elliptical (FIG. 2A) or long elliptical (FIG. 1A), or gourd-shaped. The protrusion 3 may be present in any position within each depression 2.

Figure 3A:
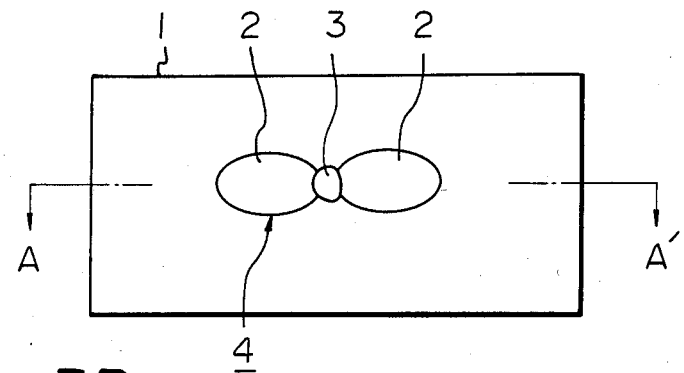
FIG. 3A is a diagrammatic plan view illustrating depressions having a protrusion in the area where the depressions are contiguous to each other and FIG. 3B is a diagrammatic cross-sectional view thereof cut along the line A-A' in FIG. 3A.
Figure 3B:
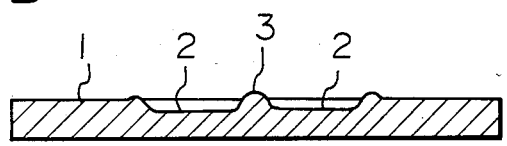
Figure 4:
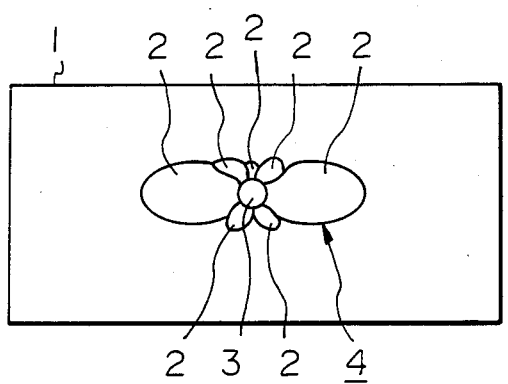
FIG. 4 is a diagrammatic plan view illustrating depressions having a protrusion in the area where the depressions are contiguous to each other.

Referring to FIGS. 3A and 3B and FIG. 4, one or more protrusions 3 are formed in the area where two or more depressions 2 are contiguous to each other. More specifically, a protrusion 3 may occupy the area where two elliptical depressions 2 as shown in FIG. 3A, or a protrusion 3 may occupy the area where seven depressions 2 are contiguous to each other as shown in FIG. 4.

Figure 5:
FIG. 5 and FIG. 6 are microphotographs illustrating depressions and protrusions formed on a surface of the film of the present invention.
Figure 6:

The configuration of each combination of at least one depression with at least one protrusion is more specifically illustrated in FIGS. 5 and 6, which are microphotographs of 5,000× magnification.

A plurality of combinations of at least one depression with at least one protrusion should be present on at least one surface of the biaxially oriented film. Preferably, these depressions and protrusions are present on both the surfaces of the biaxially oriented film.

The area fraction of the depressions should be in the range of from $1 \times 10^{-3}$ to $6 \times 10^{-1}$, preferably from $3 \times 10^{-3}$ to $4 \times 10^{-1}$. If the area fraction of the depressions exceeds the upper limit, the S/N ratio of the resulting magnetic recording tape is reduced. In contrast, if the area fraction of the depressions is lower than the lower limit, the S/N ratio is reduced and the back-tension upon running increases to an undesirable extent.

It is preferable that the surface depressions have an area average diameter of from 0.5 to $5\mu$, more preferably from 1 to $3\mu$. If the area average diameter of the depressions is outside this range, the S/N ratio of the resulting magnetic recording tape is reduced.

Furthermore, the surface depressions and protrusions should preferably exhibit a center line average roughness of from 0.07 to $0.003\mu$, more preferably 0.04 to $0.006\mu$. If the center line average roughness exceeds the upper limit, the S/N ratio of the resulting magnetic recording tape is reduced. If the center line average roughness is lower than the lower limit, the runnability of the tape is reduced.

The biaxially oriented polyester film of the present invention may be prepared as follows. A polyester containing inert inorganic particles and/or internal particles is melt-extruded at a temperature of 270° to 300° C. and the molten extrudate is quenched on a casting drum to obtain a sheet or film. Then, the sheet or film is biaxially drawn at a temperature of from 70° to 160° C. and the resultant drawn film is heat-set at a temperature of 150° to 240° C. The biaxial drawing may be carried out in a known manner at a conventional drawing ratio by a sequential multi-stage procedure or a simultaneous single stage procedure.

In the course of the film production, the film is subjected to a surface depression-forming treatment. A typical example of the surface depression-forming treatment is a process wherein the film is immersed in an organic liquid before the film is subjected to the drawing step or after it is subjected only to the first stage drawing in a multi-stage drawing step. The organic liquid used includes, for example, methanol and ethanol. The immersion may usually be carried out at a temperature of from room temperature to 40° C. for 5 to 20 seconds. The process for forming the surface depressions is not particularly critical, provided that the surface depressions of the desired area fraction are formed.

The biaxially oriented polyester film of the present invention may be either balanced films having a strength of 9 to 12 kg/mm$^2$ at an elongation of 5% in both the longitudinal and transverse directions, or semi-tensilized or tensilized films, which have been tensilized in a certain direction. The semi-tensilized and tensilized films include, for example, longitudinally semi-tensilized films having a strength of 12.1 to 14 kg/mm$^2$ at an elongation of 5% in the longitudinal direction, longitudinally tensilized films having a strength of at least 14.1 kg/mm$^2$ at an elongation of 5% in the longitudinal direction, transversely semi-tensilized films having a strength of 12.1 to 14.0 kg/mm$^2$ at an elongation of 5% in the transverse direction, and transversely tensilized films having a strength of at least 14.1 kg/mm$^2$ at an elongation of 5% in the transverse direction. Of these, tensilized films are preferable.

The biaxially oriented polyester film of the present invention, which has a plurality of combinations of one or more depressions with one or more protrusions on at least one surface thereof, is satisfactory in both electromagnetic transducing characteristics and runnability as shown in the examples described below.

Characteristics of the substrate film and the magnetic recording tape made therefrom are determined as follows.

(i) Depressions and protrusions:
Depressions and protrusions are observed on a photomicrograph of the surface of the substrate film.

(ii) Area fraction and area average diameter of depressions:

The area fraction of depressions is calculated from the equation:

$$\text{area fraction} = \left(\sum_i n_i D_i\right) / S$$

wherein $D_i$ is an area of a certain depression and $n_i$ is the number of depressions having an area of $D_i$.

The area average diameter is calculated from the equation:

$$\text{area average diameter} = \left[\left(\sum_i D_i / \sum_i n_i\right) / \pi\right]^{\frac{1}{2}} \times 2$$

(iii) Center line average surface roughness (Ra):

Ra is determined according to DIN 4768 using Hommel tester model T10 at a cut-off of 0.25 mm.

(iv) Signal-to-noise ratio (S/N ratio)

Using a commercially available VHS type video tape recorder, a 50% white level signal is recorded on a tape specimen at the optimum recording current. The ratio of the reproduced signal to the noise is determined by using a color video noise meter model 925C (supplied by Shibasoku K.K.). A reference S/N ratio is similarly determined on a tape prepared from a conventional substrate film having surface protrusions but having no surface depressions. The S/N ratio is expressed in terms of the difference between the S/N ratio as determined on the tape specimen and the reference S/N ratio.

(v) Back-tension:

The back-tension of a tape specimen upon running is measured at the entrance of the impedance roll of a commercially available VHS type video tape recorder.

The following examples are given to illustrate the invention, but should not be interpreted as limiting the scope of the invention. In the examples, percentages and parts are by weight unless otherwise specified.

EXAMPLE 1

Polyethylene terephthalate having an intrinsic viscosity of 0.60 and a softening point of 260° C. and having incorporated therein as internal particle-forming sources 0.15 part of lithium acetate, 0.09 part of calcium acetate, and 0.13 part of trimethyl phosphate was melt-extruded at 280° C. to form a sheet. The sheet was immersed in methanol at room temperature for 10 seconds and then dried to remove methanol therefrom. Thereafter, 10 substrate film specimens having different surface configurations and possessing a thickness of 15μ were prepared from the sheet as follows: The sheet was drawn in the longitudinal direction at a temperature of 80° C. to 130° C. and at a drawing ratio of 2.5 to 4.0 (based on its original length) and, then, further drawn in the transverse direction at a temperature of 90° C. to 130° C. and at a drawing ratio of 2.5 to 4.5 (based on the length of the longitudinally drawn film; which drawing ratio was equal to or larger than the drawing ratio in the longitudinal direction). Each biaxially drawn film was heat-set at a temperature of 200° C.

A coating composition having the following composition was dispersed in a mixed solvent of toluene, methyl ethyl ketone, and ethyl acetate in an amount of 1.8 times by weight of the coating composition.

| Material | Coating composition Parts (by weight) |
| --- | --- |
| $CrO_2$ | 400 |
| Nitrocellulose | 40 |
| Thermoplastic polyurethane | 30 |
| Butadiene/acrylonitrile copolymer | 30 |
| Lecithin | 2 |
| Olive oil | 2 |

The dispersion was coated on each substrate specimen at a coating thickness of 5μ (expressed in terms of the final thickness). The coated specimen was subjected to magnetic material orientation treatment, drying, curing, and then mirror finishing in a conventional manner to obtain a video tape having a width of 0.5 inch. The S/N ratio and back-tension upon running of the video tape are shown in Table I, below.

Microphotographs (5,000× magnification) of the substrate specimens Run Nos. 7 and 8 (shown in Table I, below) are shown in FIGS. 6 and 5, respectively.

TABLE I

| | Characteristics of substrate | | Characteristics of magnetic recording tape | |
| --- | --- | --- | --- | --- |
| Run No. | Area fraction of depressions | Ra (μ) | S/N (db) | Back-tension upon running (g) |
| 1* | 0 | 0.035 | 0 | 31.5 |
| 2* | $5.9 \times 10^{-4}$ | 0.035 | 0 | 31.2 |
| 3 | $1.1 \times 10^{-3}$ | 0.032 | +0.6 | 30.2 |
| 4 | $3.0 \times 10^{-3}$ | 0.030 | +1.2 | 28.9 |
| 5 | $4.2 \times 10^{-3}$ | 0.027 | +1.6 | 27.0 |
| 6 | $7.9 \times 10^{-3}$ | 0.027 | +1.8 | 26.8 |
| 7 | $9.2 \times 10^{-2}$ | 0.027 | +1.7 | 25.0 |
| 8 | $3.6 \times 10^{-1}$ | 0.032 | +0.9 | 21.9 |
| 9 | $5.7 \times 10^{-1}$ | 0.034 | +0.2 | 20.7 |
| 10* | $6.4 \times 10^{-1}$ | 0.036 | 0 | 20.6 |
| 11* | $7.7 \times 10^{-1}$ | 0.037 | −0.2 | 20.5 |

*Comparative examples

As is seen from Table I, the video tapes made from the substrate films having an area fraction of depressions falling within the range of from $1 \times 10^{-3}$ to $6 \times 10^{-1}$, especially from $3 \times 10^{-3}$ to $4 \times 10^{-1}$, exhibit an enhanced S/N ratio and a reduced back-tension as compared with those made from the conventional substrate film (Run No. 1).

EXAMPLE 2

Following the same procedure as described in EXAMPLE 1, substrate films having various area average diameters of depressions and center line average roughnesses were prepared wherein finely divided silica particles having an average particle diameter of 1μ were used instead of the internal particle-forming sources. Video tapes were produced from these substrate films and their characteristics were tested, in a manner similar to that described in EXAMPLE 1. The results are shown in Table II, below.

TABLE II

| | | Characteristics of substrate | | Characteristics of magnetic recording tape |
| --- | --- | --- | --- | --- |
| Run No. | Amount of silica added (%) | Ra (μ) | Area average diameter (μ) | S/N (db) |
| 1* | 0 | 0.035 | — | 0 |
| 2 | 0 | 0.032 | 2.2 | +0.6 |
| 3 | 0.005 | 0.035 | 2.8 | +0.5 |
| 4 | 0.02 | 0.040 | 3.5 | +0.3 |
| 5 | 0.08 | 0.065 | 4.8 | +0.1 |

TABLE II-continued

| Run No. | Amount of silica added (%) | Characteristics of substrate | | Characteristics of magnetic recording tape |
|---|---|---|---|---|
| | | Ra (μ) | Area average diameter (μ) | S/N (db) |
| 6 | 0.15 | 0.078 | 5.5 | −0.5 |

Note:
The specimens of Run No. 1 and No. 2 are the same as Run No. 1 and No. 3 in EXAMPLE 1, respectively.

As is seen from Table II, the video tapes made from the substrate films having an Ra of not larger than 0.07μ, more preferably not larger than 0.04μ, exhibit a desirably enhanced S/N ratio. It will also be seen that the area average diameter of depressions of not larger than 5μ, especially not larger than 3μ, is desired for the enhancement of the S/N ratio.

EXAMPLE 3

Following the same procedure as described in EXAMPLE 1, substrate films having various area average diameters of depressions and center line average roughnesses were prepared wherein 0.1% by weight, based on the weight of the substrate film, of finely divided silica or calcium carbonate particles having volume averate particle diameters shown in Table III were used instead of the internal particle-forming sources. Video tapes were produced from these substrate films and their characteristics were tested, in a manner similar to that described in EXAMPLE 1. The results are shown in Table III, below.

TABLE III

| Run No. | Inorganic particles and their diameters | Characteristics of substrate | | Characteristics of magnetic recording tape |
|---|---|---|---|---|
| | | Ra (μ) | Area fraction of depressions | S/N (db) |
| 1* | — | 0.035 | — | 0 |
| 2 | 1.2μ SiO₂ | 0.032 | 5.0 × 10⁻³ | +1.0 |
| 3 | 2.1μ SiO₂ | 0.053 | 3.6 × 10⁻³ | +0.4 |
| 4 | 3.1μ SiO₂ | 0.072 | 5.5 × 10⁻³ | −0.3 |
| 5 | 0.8μ CaCl₃ | 0.030 | 4.5 × 10⁻³ | +1.3 |

Note:
The specimen of Run No. 1 is the same as that of Run No. 1 in EXAMPLE 1.

As is seen from Table III, the substrate films having depressions and having an Ra of not larger than 0.07μ result in video tapes of a desirably enhanced S/N ratio.

We claim:

1. A biaxially oriented polyester film which has a plurality of depressions and a plurality of protrusions on at least one surface thereof, in a configuration such that at least one protrusion exists within each depression or at least one protrusion exists in the area where two or more depressions are contiguous to each other, said depressions having an area fraction of from $1 \times 10^{-3}$ to $6 \times 10^{-1}$ and said film containing at least one type of particles selected from the group consisting of inert inorganic particles and internal particles.

2. A biaxially oriented polyester film according to claim 1, wherein said depressions have an area fraction of from $3 \times 10^{-3}$ to $4 \times 10^{-1}$.

3. A biaxially oriented polyester film according to claim 1, wherein said depressions have an area average diameter of from 0.5 to 5 microns.

4. A biaxially oriented polyester film according to claim 1, wherein said depressions have an area average diameter of from 1 to 3 microns.

5. A biaxially oriented polyester film according to claim 1, wherein the center line average roughness of the surface, on which the depressions and the protrusions have been formed, is in the range of from 0.07 to 0.003μ.

6. A biaxially oriented polyester film according to claim 1, wherein the center line average roughness of the surface, on which the depressions and the protrusions have been formed, is in the range of from 0.04 to 0.006μ.

7. A biaxially oriented polyester film according to claim 1, wherein said film is a semi-tensilized film.

8. A biaxially oriented polyester film according to claim 1, wherein said film is a tensilized film.

9. A biaxially oriented polyester film according to claim 1, wherein the amount of said particles contained in the film is in the range of from 0.01 to 1.0% by weight based on the weight of the film.

10. A biaxially oriented polyester film according to claim 1, wherein the amount of said particles contained in the film is in the range of from 0.02 to 0.5% by weight based on the weight of the film.

11. A biaxially oriented polyester film according to claim 1, wherein said inert inorganic particles have a volume average particle diameter of from 5 to 0.01μ.

12. A biaxially oriented polyester film according to claim 1, wherein said inert inorganic particles have a volume average particle diameter of from 2 to 0.03μ.

13. A biaxially oriented polyester film according to claim 1, wherein said internal particles have a volume average particle diameter of 5 to 0.1 micron.

14. A biaxially oriented polyester film according to claim 1, wherein said internal particles have a volume average particle diameter of 3 to 0.5μ.

15. A biaxially oriented polyester film according to claim 1, wherein said inert inorganic particles are at least one type of particles selected from the group consisting of $SiO_2$, $CaCO_3$ and kaolinite.

16. A biaxially oriented polyester film according to claim 1, wherein said inert inorganic particles are $SiO_2$ particles.

17. A biaxially oriented polyester film according to claim 1, wherein said polyester is a homopolymer obtained by the polycondensation of terephthalic acid or naphthalenedicarboxylic acid with ethylene glycol, or a copolymer containing at least 70% by weight of the recurring units derived by the polycondensation of terephthalic acid or naphthalene-dicarboxylic acid with ethylene glycol.

18. A biaxially oriented polyester film according to claim 1, wherein said polyester is polyethylene terephthalate.

19. A biaxially oriented polyester film according to claim 1, wherein said depressions and said protrusions are formed on both the surfaces of the polyester film.

20. A biaxially oriented polyester film according to claim 1, wherein said internal particles are insoluble particles precipitated during the polycondensation stage of polymerization by the reaction of monomer or oligomer with catalyst residue or anti-coloring agent containing a member of the group consisting of Ca, Si, Mn, Mg, Sb, Ge, P, Li, K and Na.

* * * * *